(12) United States Patent
Itskovich et al.

(10) Patent No.: US 8,633,701 B2
(45) Date of Patent: Jan. 21, 2014

(54) METHOD AND APPARATUS FOR GALVANIC MULTI-FREQUENCY FORMATION RESISTIVITY IMAGING

(75) Inventors: Gregory B. Itskovich, Houston, TX (US); Alexandre N. Bespalov, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 219 days.

(21) Appl. No.: 12/787,208

(22) Filed: May 25, 2010

(65) Prior Publication Data

US 2011/0025335 A1 Feb. 3, 2011

Related U.S. Application Data

(60) Provisional application No. 61/273,066, filed on Jul. 30, 2009.

(51) Int. Cl.
*G01V 3/00* (2006.01)

(52) U.S. Cl.
USPC .......................................... 324/355; 324/366

(58) Field of Classification Search
USPC .......................................................... 324/355
See application file for complete search history.

(56) References Cited

U.S. PATENT DOCUMENTS

| | | | |
|---|---|---|---|
| 3,973,181 A * | 8/1976 | Calvert .......................... | 324/355 |
| 4,630,243 A | 12/1986 | MacLeod | |
| 5,869,968 A * | 2/1999 | Brooks et al. ................. | 324/338 |
| 5,883,516 A | 3/1999 | Steenwyk et al. | |
| 7,365,545 B2 | 4/2008 | Itskovich et al. | |
| 7,385,401 B2 | 6/2008 | Itskovich et al. | |
| 7,394,258 B2 | 7/2008 | Itskovich et al. | |
| 7,397,250 B2 | 7/2008 | Bespalov et al. | |
| 7,612,567 B2 | 11/2009 | Itskovich et al. | |
| 7,656,747 B2 | 2/2010 | Mandal et al. | |
| 2003/0006768 A1 | 1/2003 | Kleinberg et al. | |
| 2007/0103159 A1 | 5/2007 | Forgang et al. | |
| 2007/0279063 A1 * | 12/2007 | Beard ........................... | 324/355 |
| 2009/0105955 A1 | 4/2009 | Castillo et al. | |

OTHER PUBLICATIONS

Shuskahov, O.A. "Groundwater NMR in Conductive Water" Geophysics, Aug. 1996, vol. 61(4), pp. 998-1006.

* cited by examiner

*Primary Examiner* — Jermele M Hollington
*Assistant Examiner* — David M. Schindler
(74) *Attorney, Agent, or Firm* — Mossman Kumar & Tyler PC

(57) ABSTRACT

A formation measurement and processing technique which reduces the effects of standoff between a resistivity tool and a borehole wall where the resistivity tool utilizes capacitive coupling between the tool and the formation to obtain resistivity data useful to generate a resistivity image of the formation. Reduction of standoff effects is achieved through the use of multi-frequency, phase sensitive measurements to identify a measured resonance frequency that may be used to produce an image that utilizes measurements least affected by the tool standoff and unknown or unspecified inductance of the tool. Reduction of standoff effects are the most pronounced in the case of the low resistivity formations and oil-based, low-conductive drilling fluids.

12 Claims, 6 Drawing Sheets

METHOD AND APPARATUS FOR GALVANIC MULTI-FREQUENCY FORMATION RESISTIVITY IMAGING

CROSS-REFERENCES TO RELATED APPLICATIONS

This application claims priority from U.S. Provisional Patent Application Ser. No. 61/273,066 filed on 30 Jul. 2009.

BACKGROUND OF THE DISCLOSURE

1. Field of the Disclosure

This disclosure generally relates to exploration and production of hydrocarbons involving investigations of regions of an earth formation penetrated by a borehole. More specifically, the disclosure relates to the accurate measurement and imaging of the resistivity of an earth formation using a logging tool in a borehole.

2. Description of the Related Art

Electrical earth borehole logging is well known to persons having an ordinary level of skill in the art, and various devices and various techniques have been described for this purpose. Broadly speaking, there are two categories of electrical logging apparatus. In the first category, one or more measurement electrodes—current source(s) or sink(s)—are used in conjunction with a return electrode (which may be a diffuse electrode such as a logging tool's body or mandrel). A measurement current flows in a circuit that connects a current source to the measurement electrode(s), through the earth formation to the return electrode, and back to the current source in the tool. In a second category, that of inductive measuring tools, an antenna within the measuring instrument induces a current flow within the earth formation. The magnitude of the induced current is detected using either the same antenna or a separate receiver antenna. The present disclosure belongs to the first category.

Electrical logging devices may be operable in one or more modes. In one mode, a constant current is maintained at a measuring electrode while a voltage is measured; in another mode, the voltage of the measuring electrode is held constant and the current is measured. Ideally, if current is varied to maintain a constant voltage, the resultant current is inversely proportional to the resistivity of the earth formation being investigated. Conversely, if current is maintained constant through the circuit, ideally speaking the voltage of the measurement electrode is proportional to the resistivity of the earth formation being investigated. Ohm's law teaches that if both current and voltage vary, the resistivity of the earth formation is proportional to the ratio of the voltage to the current.

Of course, the foregoing is a simplified and idealized description of physical relationships that are more complex in practical application. Those of ordinary skill in the art will appreciate that there are usually other variables to consider, for example the electrical characteristics of the instrumentation itself and the electrical characteristics of the environment under investigation. The prior art suggests innumerable approaches for addressing such non-idealized factors.

It is known that oil-based drilling fluids ("muds") may be used when drilling through water-soluble formations, and an increasing number of present day exploration prospects are believed to lie beneath water-soluble salt layers. The use of oil-based muds, which have a low conductivity relative to water-based muds, implicates a potential drawback in the use of contact electrodes to inject electrical currents into a wellbore. Any standoff or gap between an electrode and a wellbore wall creates a standoff impedance; and as electrode standoff increases, the corresponding impedance can begin at some point to dominate resistivity measurements taken through the electrode. Increasing borehole rugosity, which tends to increase average electrode standoff, thus becomes especially problematic.

In addition to deteriorating the electrical contact between the logging tool and the formation, invasion of resistive, oil-based mud into porous formations substantially reduces the effectiveness of prior art resistivity imaging devices. This problem is not, generally speaking, fully alleviated by the use of focusing electrodes.

It would therefore be desirable to have an apparatus and method for determining formation resistivity that is relatively insensitive to borehole rugosity and can be used with either water based or with oil-based muds. It is believed that the present disclosure satisfies this need.

SUMMARY OF THE DISCLOSURE

In view of the foregoing, the present disclosure is directed to a method and apparatus for resistivity measurement and imaging of subterranean formations penetrated by a borehole.

In one embodiment according to the present disclosure, an apparatus for evaluating an earth formation through resistivity measurement and imaging is provided. A logging tool is provided having at least one measurement electrode and at least one return electrode. Measurement signals (voltage, current, or both) may be conveyed into the wall of a borehole drilled through the formation under investigation. The tool may be operated in a multi-frequency measurement mode in which a plurality of resistivity measurements are made with a range of measurement signal frequencies. In one embodiment, frequencies ranging between 5 MHz and 20 MHz are used.

In accordance with one aspect of the present disclosure, once the multifrequency measurements have been made, the resulting measured impedance values are analyzed in order to identify one or more impedances in which the reactive component of the impedance is at or close to zero. Such a value suggests that the corresponding measurement signal frequency was at or close to the resonance frequency of the measurement circuit, which includes an unknown or unspecified inductance of the logging tool and the capacitance due to the capacitive coupling between the measurement electrode 110 and the borehole sidewall. By selecting measurements in which the reactive component of the impedance is at or close to zero, the effects of inductance and capacitance in the measurement circuitry are minimized and/or negligible relative to the active component of the measured impedance, which reflects the actual resistance of the formation.

In accordance with one aspect of the present disclosure, a subset of the multi-frequency measurements which exhibit acceptably low reactive impedance components may be used to generate a resistivity image of the formation. A reactive impedance may be low when the reactive component of the measured impedance does not dominate over the active component of the measured impedance.

In another embodiment according to the present disclosure, a method of analyzing an earth formation through resistivity measurement and imaging is disclosed. The method involves performing a plurality of resistivity measurements with measurement signals varying in frequency within a predetermined range. The method further involves selecting those resistivity measurements in which the active component of the measured impedance value dominates over the reactive component. The selected measurements are then used to generate a resistivity image of the formation using known techniques.

Another embodiment according to the present disclosure includes an apparatus configured to estimate a value of a resistivity property of an earth formation, comprising: a carrier configured to be positioned in a borehole in the earth formation, comprising: at least one return electrode configured to produce a response to each of a plurality of measurement signals at a plurality of frequencies; and a processor configured to use the produced responses from the at least one return electrode and configured to estimate the value of the resistivity property using a frequency based on an estimated value of a resonance frequency.

Another embodiment according to the present disclosure includes a method for evaluating an earth formation penetrated by a borehole in an earth formation, comprising: estimating a value of a resistivity property using a frequency based on an estimated value of a resonance frequency, the frequency based on the estimated value of the resonance frequency being one of a plurality of frequencies used in a plurality of measurement signals produced by a return electrode.

Yet another embodiment according to the present disclosure includes a computer-readable medium, for estimating a parameter of interest of an earth formation, having instructions that, when executed, cause at least one processor to perform a method, the method comprising: estimating a value of a resistivity property using a frequency based on an estimated value of a resonance frequency, the estimated value of the resonance frequency being one of a plurality of frequencies used in a plurality of measurement signals produced by a return electrode.

BRIEF DESCRIPTION OF THE DRAWINGS

The present disclosure is best understood with reference to the accompanying figures in which like numerals refer to like elements and in which like numerals refer to like elements and in which.

DETAILED DESCRIPTION OF THE DISCLOSURE

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts may be complex and time-consuming, outside the knowledge base of typical laymen, but would nevertheless be a routine undertaking for those of ordinary skill in the relevant fields.

Figure 1:
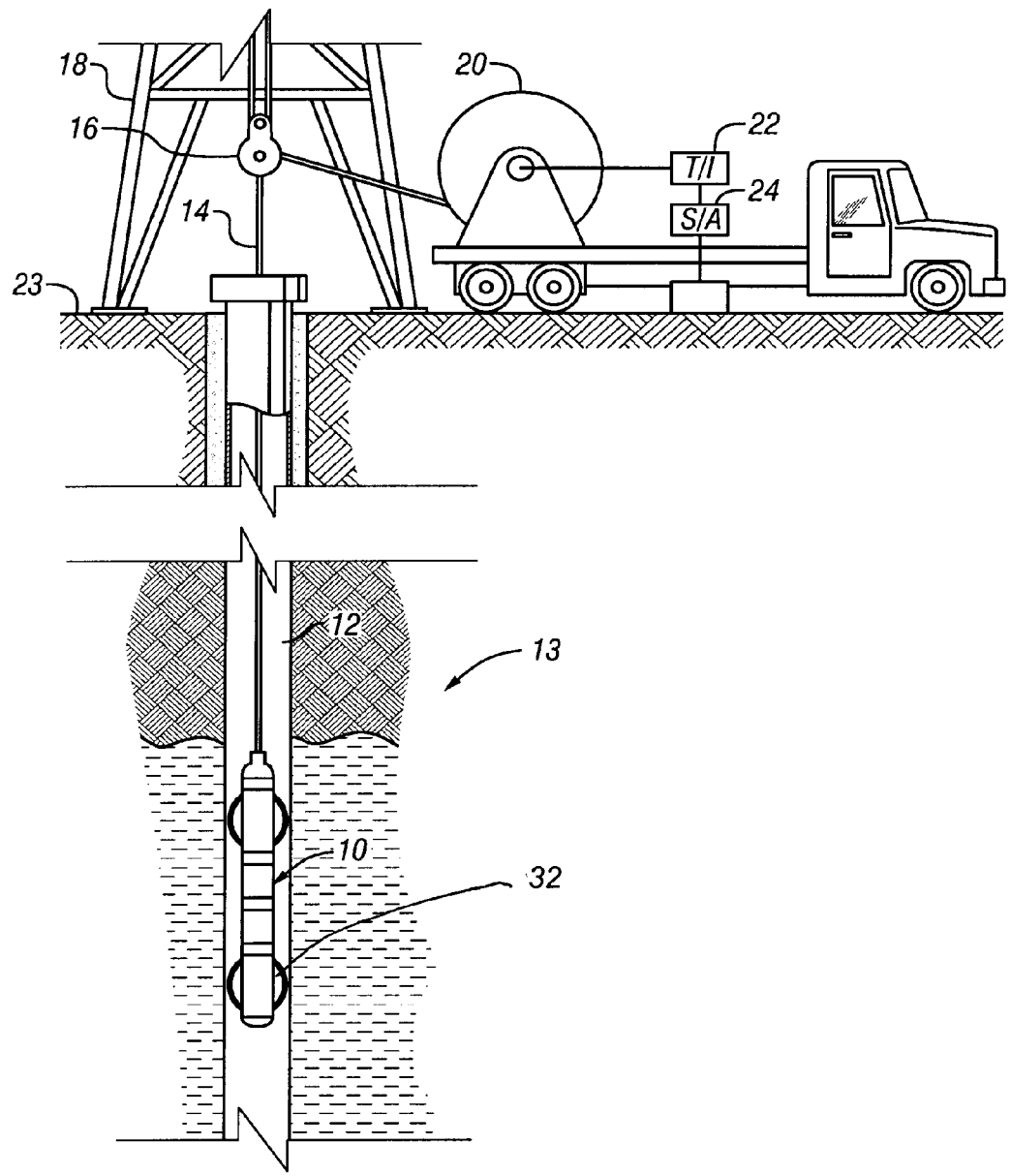
FIG. 1 is a schematic of a drilling site including a tool for estimating a resistivity parameter in an earth formation according to one embodiment of the present disclosure.

FIG. 1 shows an exemplary tool 10 disposed on carrier 32 and suspended in a borehole 12, that penetrates earth formations such as 13, from a suitable cable 14 that passes over a sheave 16 mounted on drilling rig 18. By industry standard, the cable 14 includes a stress member and a plurality of conductors for transmitting commands to the tool and for receiving data back from the tool as well as power for the tool 10. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. While a wireline conveyance system has been shown, it should be understood that embodiments of the present disclosure may be utilized in connection with tools conveyed via rigid carriers (e.g., jointed tubular or coiled tubing) as well as non-rigid carriers (e.g., wireline, slickline, e-line, etc.). Some embodiments of the present disclosure may be deployed along with LWD/MWD tools.

Figure 2:
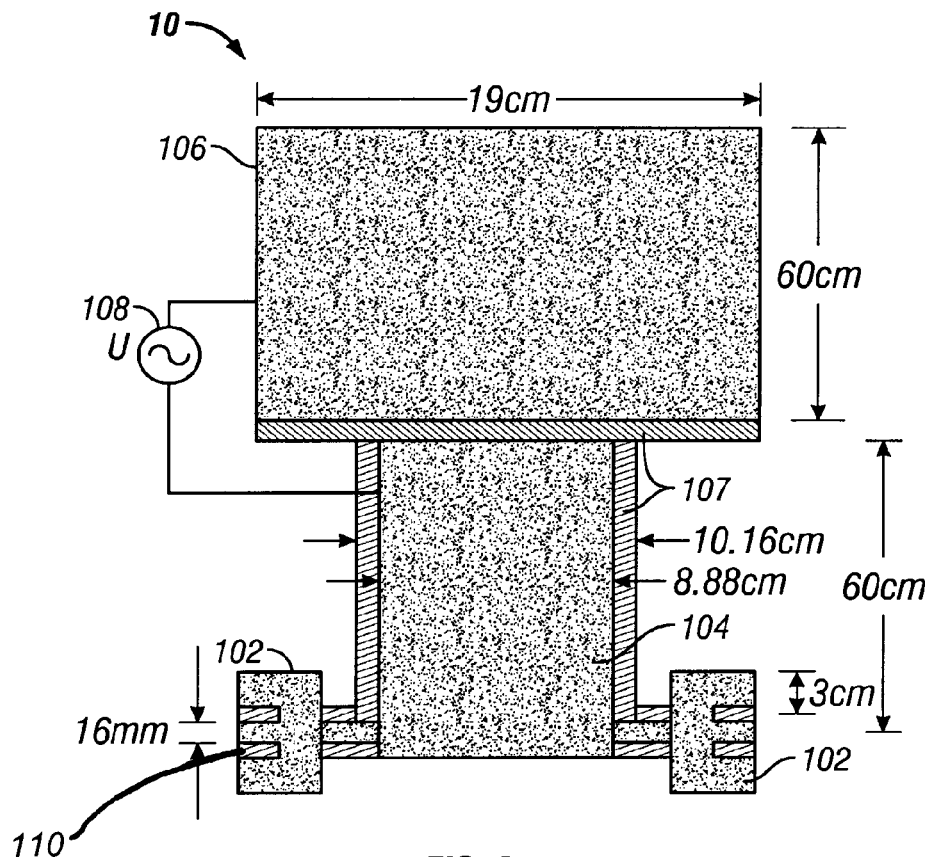
FIG. 2 is a schematic view of a resistivity tool in accordance with one embodiment of the present disclosure.

FIG. 2 is a schematic diagram showing the two-dimensional geometry of portion of a downhole tool functional as a borehole sidewall imager system in accordance with one embodiment of the disclosure. The portion of tool 10 comprising the imager system includes a plurality of resistivity arrays or pads 102 including at least one measurement electrode for conveyance of measurement signals to the earth formation within which the tool is situated. Those of ordinary skill in the art and having benefit of the present disclosure will recognize that the entire tool 10 may optionally include other functional components, as described, for example, in the U.S. Pat. No. 7,365,545 to Itskovich et al., entitled "Two Axial Pad Formation Resistivity Imager," which is hereby incorporated by reference herein in its entirety. Among these are electronics modules located at suitable locations on or within the tool 10, as would be understood by those or ordinary skill in the art. The tool's components may be mounted on a carrier 32 in a conventional and well-known manner. One portion of tool 10 may contain a telemetry module (not shown in FIG. 2) for sampling, digitizing and transmission of data samples from the various tool components uphole to surface electronics 22 in a conventional arrangement.

The two-dimensional geometry of an axially symmetric galvanic tool 10 is presented in FIG. 2. The main parts of tool 10 include at least one pad 102, a tool body 104, and return electrode 106. An insulator 107 may isolate tool body 104 from pad(s) 102 and from return electrode 106. In operation, a voltage source 108 may be applied between the pad(s) 102 and the return electrode 106. The current I through an injection button 110 on a pad 102 is measured to estimate impedance $$Z_e = \frac{V}{I},$$

where $\dot{I}$ is a complex value, such that the impedance $Z_e$ has both active and reactive components. In some embodiments, tool 10 may include control circuitry (not shown) and be configured to cause the power source 108 to send a plurality of measurement signals as a plurality of frequencies that may be imparted to the formation 13 through at least one pad 102. In some embodiments, control circuitry may reside uphole from and be operably coupled to tool 10. In some embodiments, tool 10 may be include or be operably coupled to imaging circuitry configured to generate a resistivity image from a selected plurality of measured impedance values, where the selected plurality of measure impedance values correspond to a range of frequencies including a frequency based on an estimated value of the resonance frequency. In some embodiments, data obtained from the tool 10 may be used by an imaging device (not shown) to generate the resistivity image of the formation 13.

Figure 3:
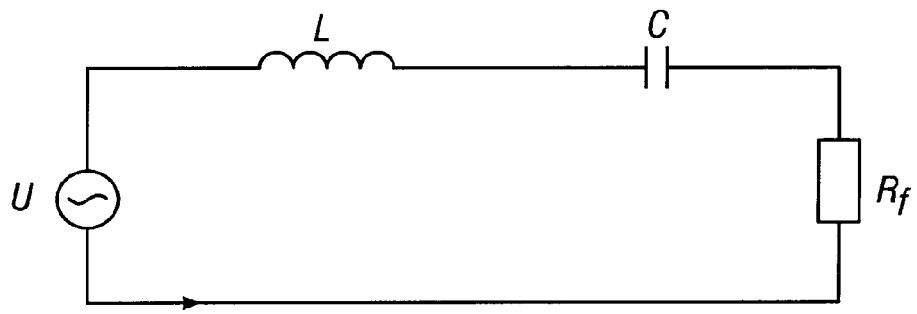
FIG. 3 is a circuit diagram of an equivalent measurement circuit realized through use of the tool of FIG. 2.

An approximate electrical circuit diagram corresponding to the tool of one embodiment according to the present disclosure with capacitive coupling between tool 10 and the formation is presented in FIG. 3. FIG. 3 shows that the measured effective impedance $Z_e$ may depend on the internal impedance of the tool $Z_T$ (represented by inductance L in FIG. 3 as hereinafter explained), the impedance due to the gap between receiver button and formation $Z_G$ (represented by capacitance C in FIG. 3 as herein after explained), and the formation resistivity $R_F$. U is the applied voltage and $\dot{I}$ is the measured current. Thus, for a measurement operation, then the effective impedance $Z_e$ is given by:

$$Z_e = Z_T + Z_G + R_f = \frac{U}{I} \quad (1)$$

In the case of oil-based mud (that is, highly resistive mud) the impedance of the gap $Z_G$ is capacitive and can be estimated as:

$$Z_G = -\frac{1}{j\omega C} \quad (2)$$

where C is the capacitance between injection button 110 and the wall of the borehole 12. At the same time, impedance of the tool $Z_T$ is modeled by inductance L, which in turn depends among other factors on the tool geometry and current path from the pad and formation to the return electrode (it is assumed that an equivalent resistor due to metal body of the tool $R_T$ is negligible compared to an equivalent resistor due to formation $R_f$); that is:

$$Z_T = \omega L \quad (3)$$

Then the total impedance $Z_e$ is given by:

$$Z_e = j\omega L - \frac{j}{\omega C} + R_f = j\left(\omega L - \frac{1}{\omega C}\right) + R_f = jX + R_f. \quad (4)$$

Those of ordinary skill in the art and having benefit of the present disclosure will appreciate that the reactive component of the impedance, X in Equation (4) above, depends on the geometry of the tool, position of the tool in the borehole, and electrical properties of the mud, among possible other factors. The information about resistivity of formation is presented in the active component of the impedance, $R_f$.

The following discussion reveals the practical value of an imaging technique in accordance with the presently disclosed embodiment.

First, there is a feature of generating a resistivity image which emphasizes the features describing the formation and at the same time minimizes the distortion of the image due to tool standoff. In accordance with one aspect of the disclosure, the image that corresponds to the measurements at the resonance frequency $\omega_0 = \sqrt{1/LC}$ depends neither upon either tool geometry, nor upon tool standoff, and follows the resistivity of formation $R_f$. Under ideal conditions, at the frequency $\omega_0$ the measured impedance $Z_e$ is equal to resistivity of formation.

Further, there is a feature of it not being necessary to take measurements at the frequency exactly equal to $\omega_0$ in order to produce image substantially unaffected by the tool standoff. In accordance with another aspect of the disclosure, in imaging the real component of the impedance $Z_e$ it may be possible to generate a resistivity image of the formation even at the frequency different from $\omega_0$. The main benefit of generating image corresponding to the frequency in the vicinity of $\omega_0$ is a possibility to perform these measurements in the most favorable conditions when useful component of the total impedance $R_f$ dominates over the reactive component X. For example, it may be desired to identify measurements in which the reactive component of the impedance is less than a threshold amount, or in which the active component may be greater than the reactive component by a predetermined factor.

In accordance with another aspect of the disclosure, the tool inductance in combination with capacitance due to a tool standoff comprises a circuit which at resonance condition has impedance equal to a resistor due to formation and does not depend on the tool standoff.

Those of ordinary skill in the art and having benefit of the present disclosure will appreciate that the method and apparatus in accordance with the present disclosure does not require knowledge about either inductance L or capacitance C, where such capacitance may be proportional to tool standoff and the dielectric constant of the drilling fluid present in the standoff gap. Multi-frequency measurements themselves, taken in a particular frequency range, allow for selection of the measurements best suitable for the imaging. Analyzing impedances at the different frequencies, the frequency which minimizes the absolute value of the reactive component X of the impedance $Z_e$ can be selected.

To illustrate the effectiveness of the multi-frequency phase-sensitive measurements, mathematical modeling has been conducted for the case when tool 10 may be placed in a homogeneous formation with resistivity of 1 Ω-m. The tool 10 may be axially symmetric and its two-dimensional geometry is presented in FIG. 2. As previously noted, the main parts of tool 10 include a pad 102, an insulated tool body 104, and a return electrode 106. Insulation elements of tool 10 are denoted with reference numeral 107 in FIG. 2. For the purposes the present disclosure, the diameter of the borehole filled with non- or low-conductive mud (e.g., oil-based mud) is 21.6 cm, the length of the tool isolative part (body) 104 is 60 cm, the length of the return electrode 106 is 60 cm, and the dielectric constant of the oil-based mud is $\varepsilon=5$. The measurement signal source (voltage or current source) 108 may be applied between pad 102 and return electrode 106. The current $\dot{I}$ (or voltage) through the circuit is measured and impedance is estimated using Ohm's law, $Z_e = V/\dot{I}$.

In one embodiment, current is injected into the formation through a 1.6 cm long cylindrical electrode that has small 1 mm standoff with respect to the formation. Measurement circuitry is provided to generate measurement signals (currents or voltages) in accordance with conventional practice familiar to those of ordinary skill in the art. In the presently disclosed embodiment, the measurement circuitry provides an output voltage of 1 V at selective frequencies varying from 5 to 20 MHz.

Figure 4:
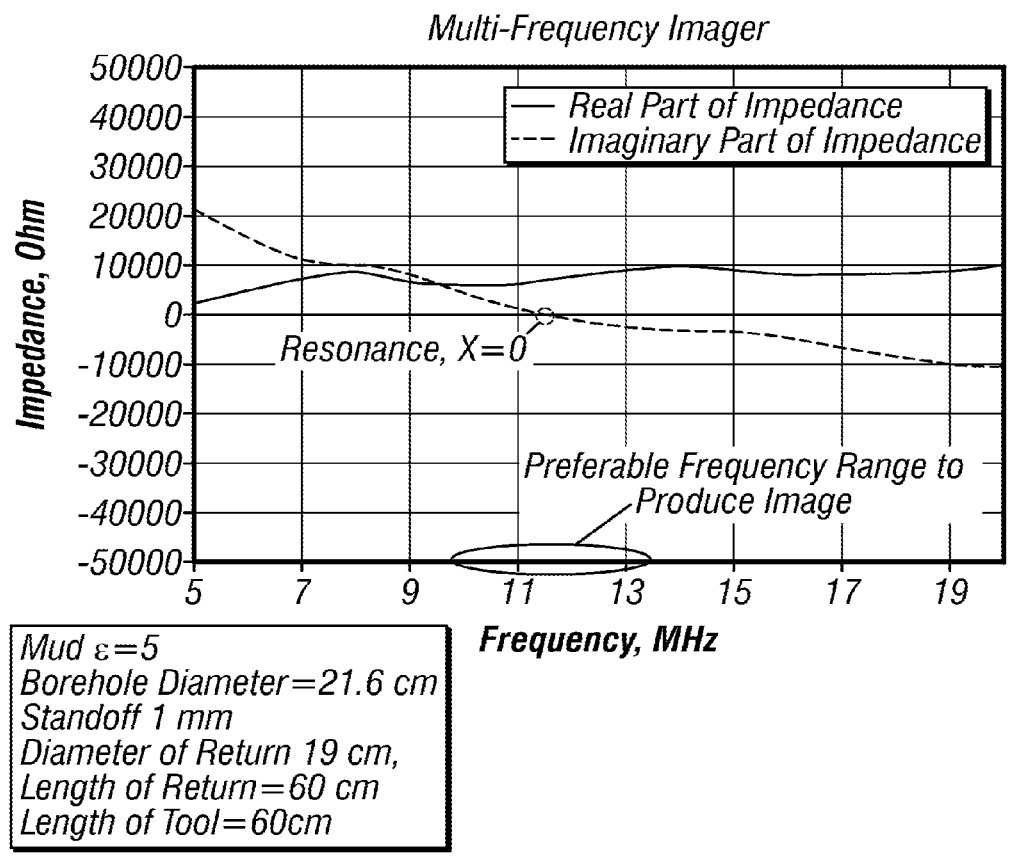
FIG. 4 is a graph of frequency versus impedance (active and reactive components) of a measurement signal response using the tool of FIG. 2 and assuming one standoff gap between a pad of the tool and a borehole wall.

In FIG. 4 there are shown both the real and imaginary components of the calculated impedances assuming the arrangement as just described. As can be observed in FIG. 4, in case of small (1 mm) standoff the imaginary component of the impedance is bigger than the real component in the frequency range below 7 MHz. Even at the frequency of 5 MHz the ratio between imaginary and the real component of the impedance Im(Z)/Re(Z) is equal to 4, which does not represent a significant challenge for accurate measurements of the real component of the impedance (since the real component is used for imaging). Even for 1 mm standoff there is an optimal frequency for producing image. This frequency corresponds to the situation where imaginary component X is equal to (or close to) zero (a resonance condition). In this case the real component dominates and can be reliably measured. As can be seen from FIG. 4, the resonance frequency is about 11.5 MHz.

In accordance with one aspect of the disclosure, however, it is not necessary to have measurements exactly at the resonance frequency. As can be observed in FIG. 3, in the frequency range from 10 to 13 MHz the real component of the impedance dominates over the imaginary component by at least one order of magnitude, which indicates that readings in this frequency range can be used to generate reliable image. One practical way to select preferable frequency is to select readings corresponding to the frequency close to the resonance frequency. As criteria for selecting readings to be used in resistivity imaging, it is possible to specify that readings within a predetermined range above and below the measured resonance frequency are used, or that readings in which the reactive impedance component is less than a predetermined maximum level are used, or that readings in which the active component of the impedance measurement is greater than the reactive component by a predetermined factor are used, or some combination of these criteria may be used.

In some embodiments, the measured resonance frequency may be the frequency at which an absolute value of the reactive component of a measured impedance is closest to zero. In other embodiments, the measured resonance frequency may be the frequency at which an absolute value of a measured impedance is closest to zero. In still other embodiments, the measured resonance frequency may be a frequency at which an absolute value of a ratio of a reactive component of the measured impedance to the measured impedance is closest to zero.

Figure 5:
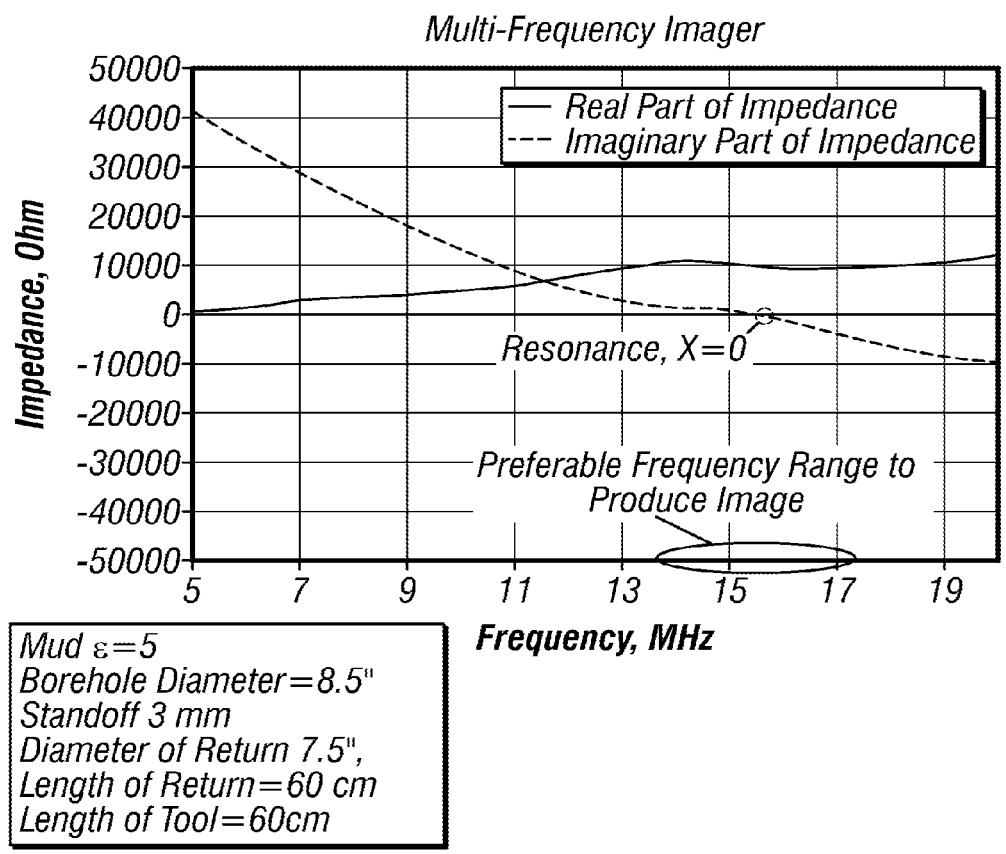
FIG. 5 is a graph of frequency versus impedance (active and reactive components) of a measurement signal response using the tool of FIG. 2 and assuming another standoff gap between a pad of the tool and a borehole wall.

The issue of selecting the optimal frequency becomes significantly more important when the standoff is increased. To illustrate this, mathematical modeling has been performed for the standoff equal to 3 mm. The results are presented in FIG. 5. As can be observed in FIG. 5, the ratio Im(Z)/Re(Z) increases compared to the previous case and reaches a factor of 40 at 5 MHz, which indicates that the imaginary component completely dominates over the real component, making it difficult to generate a stable image using 5 MHz.

Indeed, taking accurate phase sensitive measurements is quite challenging because the ratio between the real and imaginary component goes down as the standoff is increased.

Assuming that the phase is measured with an absolute error of $\phi$ radian, this leads to the parasitic component in the real component measurements in the order of $$\propto \sin\phi \operatorname{Im}(Z) \tag{5}$$

Assuming that parasitic component must be some small component $\epsilon$ of the useful signal Re (Z). Then the limit for the tolerable error in the phase measurements is defined as $$\sin\phi \approx \phi < \varepsilon \frac{\operatorname{Re}(Z)}{\operatorname{Im}(Z)} \tag{6}$$

For a 3-mm standoff and a 1-ohm/m formation, the ratio between real and imaginary components Re(Z)/Im(Z) in the case of 5 MHz is about 0.025. Assuming $\epsilon$ is 0.1 for the tolerable error $\phi$, then:

$$\phi \approx 0.1 \times 0.025 = 0.0025 \text{ radian} \approx 0.15 \text{ degrees}. \tag{7}$$

The situation is improved as the frequency is increased. Similarly to the case of 1 mm standoff, there is a frequency where imaginary component X is equal to zero. In the presently disclosed example, this happens at frequency of 15.5 MHz. Again, in accordance with one aspect of the disclosure, an approximately 3 MHz frequency range around the resonance frequency from 14 to 17 MHz is suitable for producing a high quality image, since the real component of the impedance measurements can be reliably carried out. Analysis shows that any frequency that leads to the following condition, $$abs(Im(Z_e)/Re(Z_e)) \leq 0.2 \tag{8}$$

can be selected for imaging, since under such conditions the measurements of the real component of the impedance can be reliably carried out.

Figure 6:
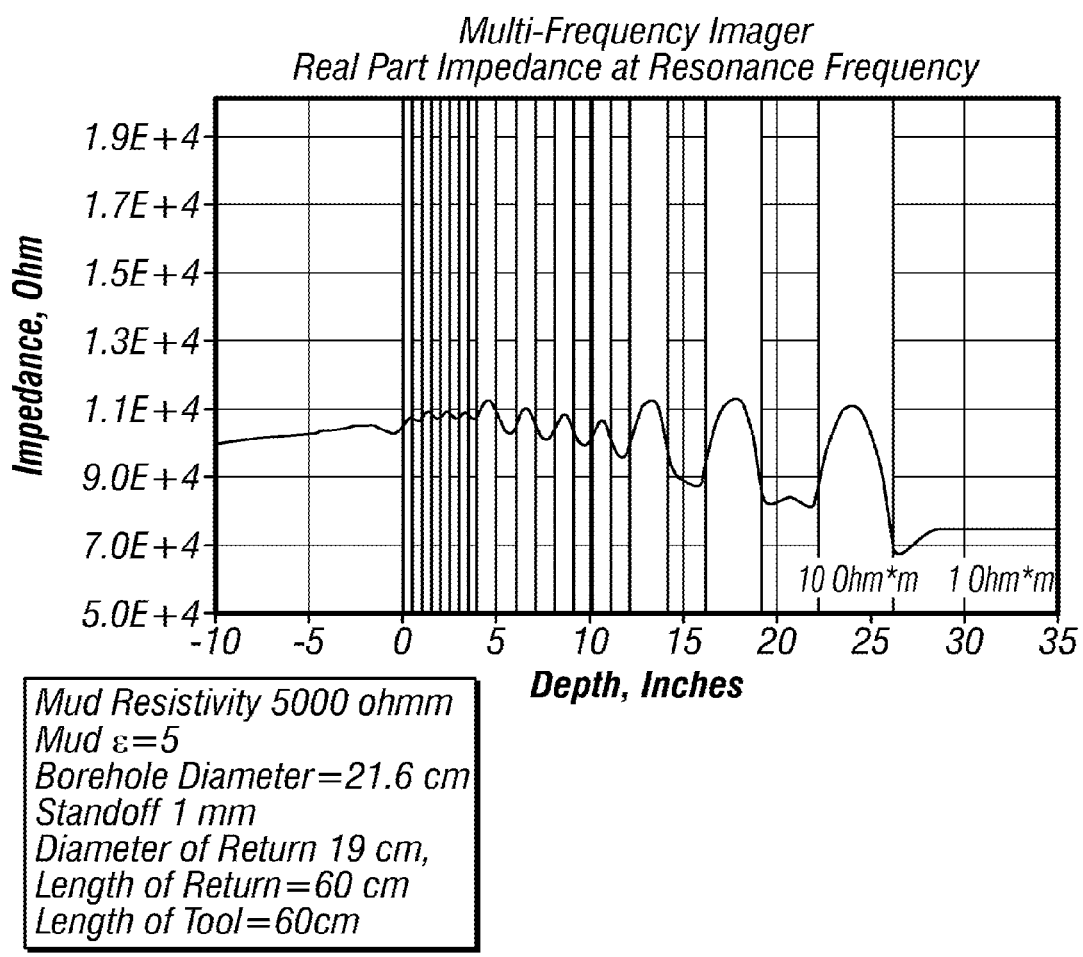
FIG. 6 is a graph of depth versus impedance (real component) measured using the tool of FIG. 2 in a stratified earth formation.

The advantage of the multi-frequency measurements is also observed in the case of a stratified formation model. In FIG. 6 there is shown mathematical modeling results in case of a formation which includes a sequence of resistive (10 $\Omega$-m) and conductive (1 $\Omega$-m) layers. The thickness of the layers varies from the left to the right between 0.5 in to 4 inches. Resistivity of the mud is 5000 $\Omega$-m and mud dielectric constant is 5. From this example it can be clearly observed that the imager in accordance with the present disclosure is capable of resolving all the layers thicker than 1 inch even in a situation when tool experiences standoff of 1 mm. Since the selected frequency corresponds to the resonance frequency $\omega_0$, it can be expected that the image will be unaffected by the reactive component of the measured impedance.

Figure 7:
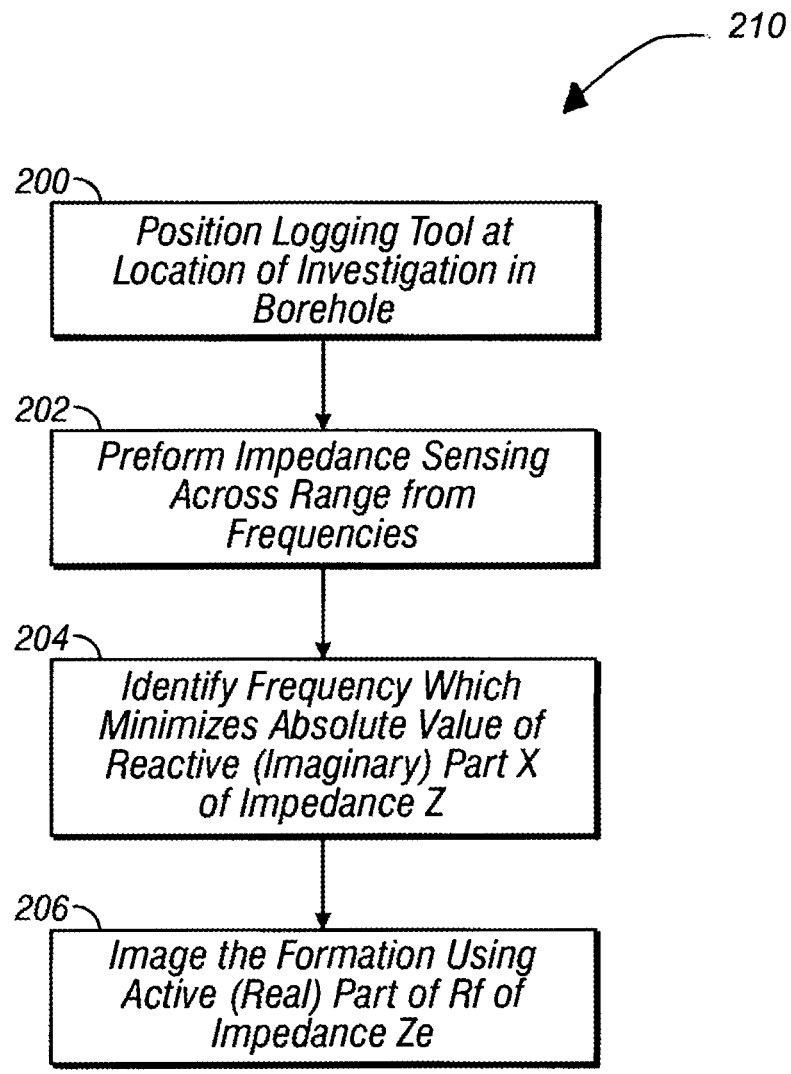
FIG. 7 is a flow diagram of a method for estimating a resistivity parameter of an earth formation in accordance with one embodiment of the present disclosure.

Turning now to FIG. 7, there is shown a flow diagram of a wellbore imaging process 210 in accordance with one embodiment of the disclosure. First, as represented by block 200 in FIG. 7, the tool 10 is positioned within the borehole at a location of interest, i.e., the site of investigation. Once positioned, tool 10 may then be operated to conduct a series of galvanic measurements, represented by block 202 in FIG. 7, in which a current is delivered from pad 102, into the formation 13 (by capacitive coupling between pad 102 and the formation, and returning to the tool body 106. In accordance with one aspect of the disclosure, these measurements may be conducted over a range of frequencies, in one embodiment over a range from five to twenty MHz, using a galvanic tool 10 of unknown or unspecified conductance.

After sensing has been performed, the results are analyzed, in block 204, to identify, as precisely as the measuring protocol will allow, measured resonance frequency, at which the reactive component of the impedance is at or close to zero. As would be understood to those of ordinary skill in the art, this is done by analyzing the phase characteristics of the measured impedance. In block 206, an image of the formation 13 may be generated using the active component of the impedance at a frequency close to the measured resonance frequency. In some embodiments, either or both of blocks 200 and 206 may not be performed.

As described herein, the method in accordance with the presently disclosed embodiment of the disclosure involves several computational steps. As would be apparent by persons of ordinary skill, these steps may be performed by computational means such as a computer, or may be performed manually by an analyst, or by some combination thereof. As an example, where the disclosed embodiment calls for selection of measured values having certain characteristics, it would be apparent to those of ordinary skill in the art that such comparison could be performed based upon a subjective assessment by an analyst or by computational assessment by a computer system properly programmed to perform such a function. To the extent that the present disclosure is implemented utilizing computer equipment to perform one or more functions, it is believed that programming computer equipment to perform these steps would be a matter of routine engineering to persons of ordinary skill in the art having the benefit of the present disclosure.

Implicit in the processing of the acquired data is the use of a computer program implemented on a suitable computational platform (dedicated or general purpose) and embodied in a suitable machine readable medium that enables the processor to perform the control and processing. The term "processor" as used in the present disclosure is intended to encompass such devices as microcontrollers, microprocessors, field-programmable gate arrays (FPGAs) and the storage medium may include ROM, RAM, EPROM, EAROM, solid-state disk, optical media, magnetic media and other media, and/or storage mechanisms as may be deemed appropriate. As discussed above, processing and control functions may be performed downhole, at the surface, or in both locations.

From the foregoing disclosure, it should be apparent that a method and apparatus for evaluating an earth formation has been disclosed involving the measurement of electrical characteristics including formation resistivity and involving measurements taken at a plurality of measurement frequencies.

Although a specific embodiment of the disclosure as well as possible variants and alternatives thereof have been described and/or suggested herein, it is to be understood that the present disclosure is intended to teach, suggest, and illustrate various features and aspects of the disclosure, but is not intended to be limiting with respect to the scope of the disclosure, as defined exclusively in and by the claims, which follow.

While the foregoing disclosure is directed to the specific embodiments of the disclosure, various modifications will be apparent to those skilled in the art. It is intended that all such variations within the scope and spirit of the appended claims be embraced by the foregoing disclosure.

What is claimed is:

1. An apparatus configured to estimate a value of a resistivity property of an earth formation, comprising:
   a carrier configured to be positioned in a borehole in the earth formation, comprising:
   at least one return electrode configured for capacitive coupling to a circuit including the earth formation and a source of a plurality of measurement signals, and configured to produce a response to each of the plurality of measurement signals at a plurality of frequencies; and
   a processor configured to use the produced responses from the at least one return electrode and configured to calculate a phase-sensitive impedance value for each of the produced responses and to estimate the value of the resistivity property from one of selected produced responses, the selected responses corresponding to frequencies within a predetermined range above and below an estimated value of a resonance frequency of the circuit, the processor further configured to obtain the estimated value of the resonance frequency by identifying one of the produced responses having a corresponding phase-sensitive impedance value with an absolute value of its reactive component smaller than an absolute value of a reactive component of each of the phase-sensitive impedance values corresponding to the other produced responses.

2. The apparatus of claim 1, further comprising:
   at least one measurement electrode disposed on the carrier and configured to convey the plurality of measurement signals at the plurality of frequencies into the earth formation.

3. The apparatus of claim 2, further comprising:
   control circuitry configured to operate the at least one measurement electrode to generate the plurality of measurement signals at the plurality of frequencies.

4. The apparatus of claim 2, wherein a standoff exists between the at least one measurement electrode and the earth formation.

5. The apparatus of claim 1, further comprising:
   imaging circuitry configured to generate a resistivity image of the formation from a plurality of impedance values corresponding to the frequencies within the predetermined range.

6. A method for evaluating an earth formation penetrated by a borehole in the earth formation, comprising:
   using at least one processor to:
   calculate a phase-sensitive impedance value for each response of responses produced by a return electrode in response to a plurality of measurement signals at a plurality of frequencies, each phase-sensitive impedance value corresponding to a frequency of a corresponding response;
   obtain an estimated value of a resonance frequency of a circuit including a source of the measurement signals and an earth formation capacitively coupled to the return electrode by identifying the frequency of one of the responses having a corresponding phase-sensitive impedance value with an absolute value of its reactive component smaller than an absolute value of a reactive component of each of the phase-sensitive impedance values corresponding to the other produced responses; and
   estimate a value of a resistivity property from one of the produced responses from a selected subset of the produced responses corresponding to frequencies within a predetermined range above and below the estimated value of the resonance frequency.

7. The method of claim 6, further comprising:
   positioning the return electrode within the borehole.

8. The method of claim 6, further comprising:
   generating a resistivity image of the formation from a plurality of impedance values corresponding to the frequencies within the predetermined range.

9. The method of claim 6, using, to generate the plurality of measurement signals, a measurement electrode that is capacitively coupled to the earth formation.

10. The method of claim 9, wherein a standoff exists between the measurement electrode and the earth formation.

11. A non-transitory computer-readable medium product having stored thereon instructions that when read by at least one processor cause the at least one processor to perform a method, the method comprising:

calculating a phase-sensitive impedance value for each response of responses produced by a return electrode in response to a plurality of measurement signals at a plurality of frequencies, each phase-sensitive impedance value corresponding to a frequency of a corresponding response;

obtaining an estimated value of a resonance frequency of a circuit including a source of the measurement signals and an earth formation capacitively coupled to the return electrode by identifying the frequency of one of the responses having a corresponding phase-sensitive impedance value with an absolute value of its reactive component smaller than an absolute value of a reactive component of each of the phase-sensitive impedance values corresponding to the other produced responses; and estimating a value of a resistivity property from one of the produced responses from a selected subset of the produced responses corresponding to frequencies within a predetermined range above and below the estimated value of the resonance frequency.

12. The non-transitory computer-readable medium product of claim 11 further comprising at least one of: (i) a ROM, (ii) a RAM, (iii) an EPROM, (iv) an EAROM, (v) a solid-state disk, and (vi) optical medium.

\* \* \* \* \*